United States Patent [19]

Weeks et al.

[11] Patent Number: 4,688,740
[45] Date of Patent: Aug. 25, 1987

[54] HAND HELD REEL

[75] Inventors: James F. Weeks, 750 Woodridge Dr., Macon, Ga. 31204; J. Richard Weeks, 828 Willow Creek Dr., Macon, Ga. 31210; William J. Dittman, Marietta, Ga.

[73] Assignees: James F. Weeks; J. Richard Weeks, both of Macon, Ga.

[21] Appl. No.: 817,494

[22] Filed: Jan. 9, 1986

[51] Int. Cl.$^4$ .............................................. B65H 75/40
[52] U.S. Cl. ........................................ 242/96; 242/99; 242/84.25
[58] Field of Search ......................... 242/96, 99, 84.25

[56] References Cited

U.S. PATENT DOCUMENTS

| | | | |
|---|---|---|---|
| 2,712,908 | 7/1955 | Kozminski | 242/99 |
| 3,289,968 | 12/1966 | Wilson | 242/96 |
| 3,388,876 | 6/1968 | Wilson | 242/96 |
| 3,952,965 | 4/1976 | Falcon | 242/96 |
| 4,522,349 | 6/1985 | Clerk | 242/96 |

Primary Examiner—Stuart S. Levy
Assistant Examiner—David Werner
Attorney, Agent, or Firm—Diller, Ramik & Wight

[57] ABSTRACT

A hand reel for fishing line is formed by an outer annular member rotatable about an inner annular member, both the inner and outer members are made of two annular halves, an outer peripheral surface of the outer annular member is of a generally U-shaped radially outwardly opening configuration as viewed in radial cross-section to accommodate fishing line thereupon, the inner annular member has a plurality of circumferentially spaced radially outwardly opening slots which guidingly receive an innermost circumferential edge of the outer annular member for guiding relative rotation between the two annular members, a slot formed in at least one of the inner annular member halves receives a brake mechanism spring biased axially outwardly and having an axial inboard end portion in bearing engagement against an annular braking surface portion of the outer annular member, the braking mechanism also includes an axially outboard end portion manually manipulable by the fingertips of a user's hand to selectively regulate the braking force to effectively create desired "drag" when utilizing the hand reel to fight a fish, the outer annular member halves having interengaged hooks and ledges along the annular braking surface portion which emit an audible sound as the braking mechanism inboard end portion moves therealong upon relative rotation of the outer annular member about the inner annular member, and the inboard end portion of the braking mechanism preferably being one or more balls each urged by a compression spring toward the annular braking surface portion.

14 Claims, 12 Drawing Figures

U.S. Patent  Aug. 25, 1987  Sheet 1 of 3  4,688,740
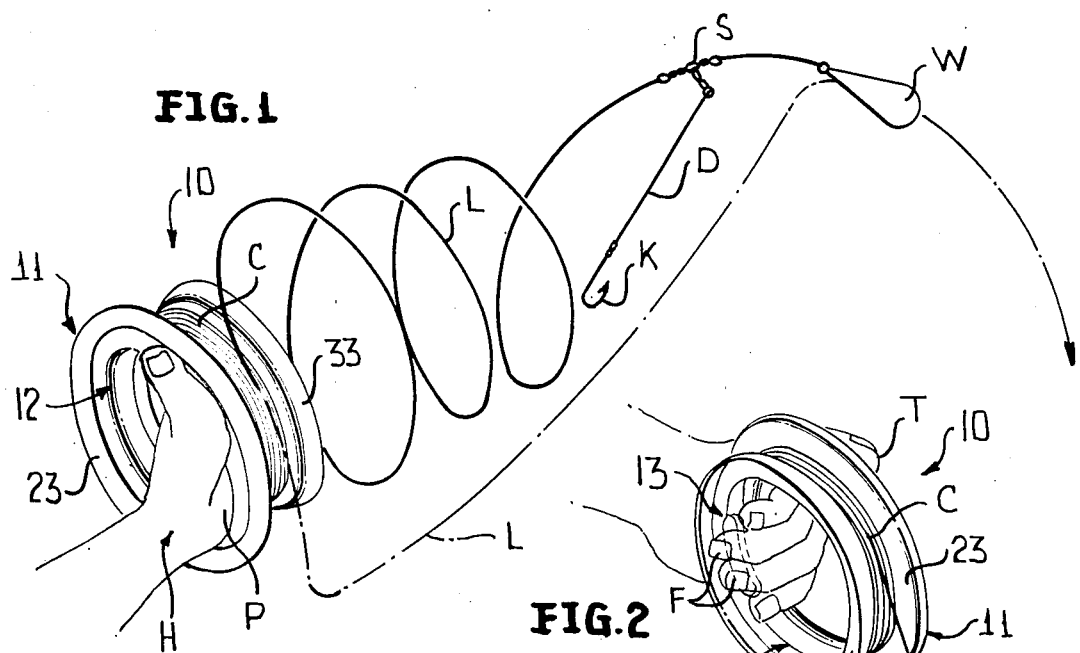
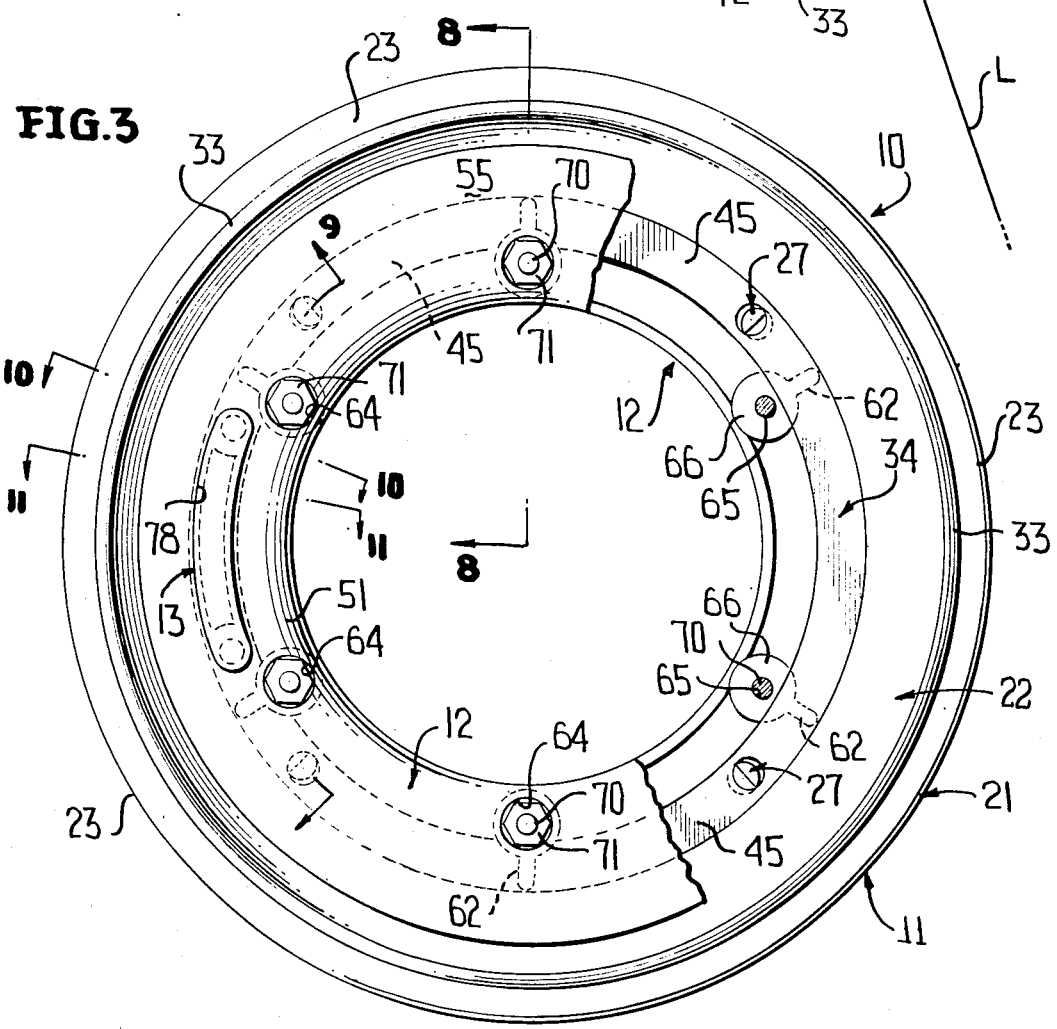

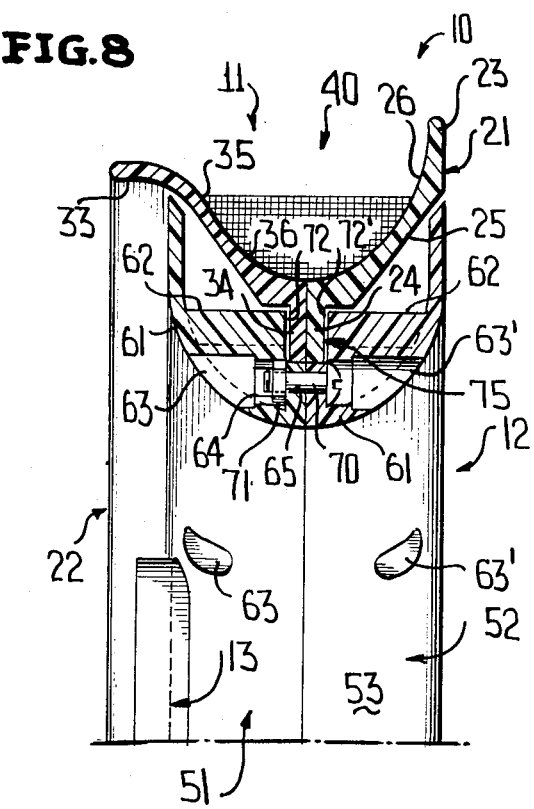
FIG.8
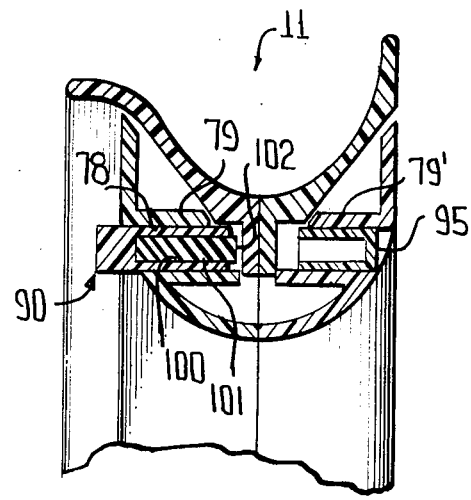
FIG.11
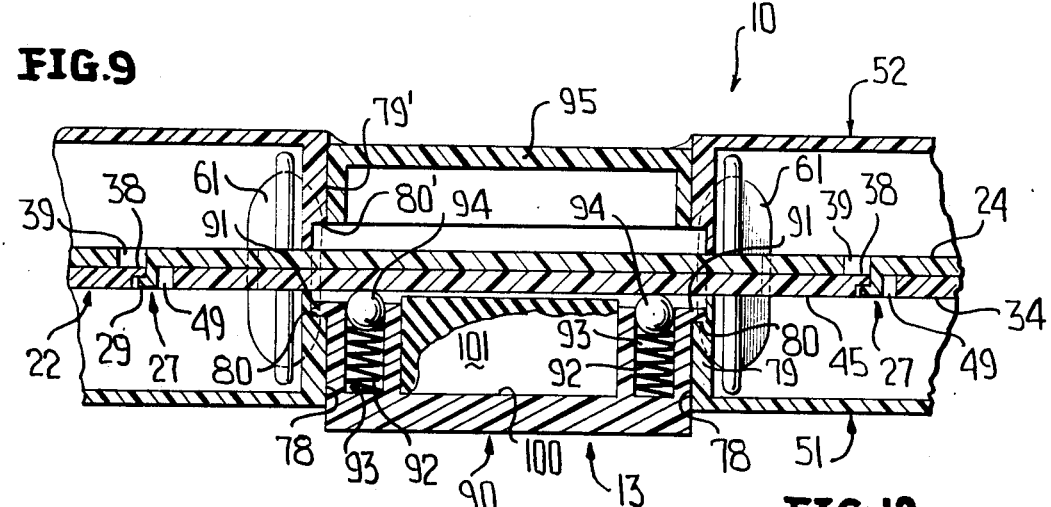
FIG.9
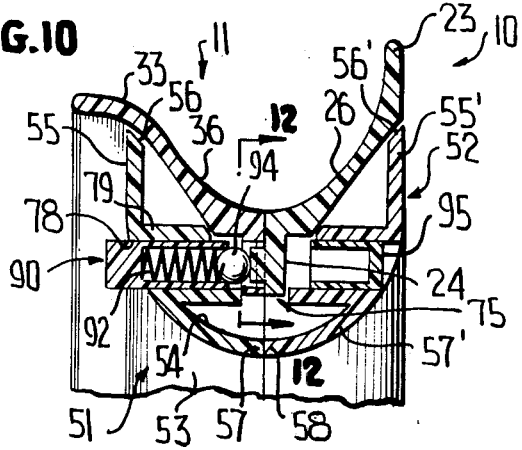
FIG.10
FIG.12

HAND HELD REEL

The present invention is directed to the field of hand reels and particularly hand reels for accommodating fishing line thereupon which is adapted to be wound and/or unwound as circumstances dictate.

Fishing reels for fishing line which are hand held are relatively conventional and typical thereof is the "FISHING APPARATUS" of U.S. Pat. No. 2,603,429 in the name of Norbert Jaworowski et al which issued on July 15, 1952. The reel disclosed in the latter patent is essentially a spool-like member formed of two half-members joined together so as to provide a central opening for accomodating the user's hand. A line-receiving groove accomodates the fishing line in a coil which can be cast therefrom in the general direction of the axis of the spool. A braking action is exercised by angling the spool axis toward the direction of flight, while a fish can be "reeled" in simply by imparting appropriate rotation to the spool by hand-over-hand movement. Though extremely simple in construction, this reel includes the major drawback of lacking precise control of the line when fighting a fish because of the absence of a braking mechanism. Desired effective braking action cannot be performed simply by manually manipulating the spool. Essentially, the fishing apparatus of this patent lacks sufficient sophistication in its simplicity to be repetitively and efficiently effective.

Another hand fishing reel is disclosed in U.S. Pat. No. 3,532,289 in the name of Richard K. Sutz which issued on Oct. 6, 1970. While this patent includes a sophisticated braking system it is exceptionally cumbersome involving scores of separate elements, as evidenced by FIG. 8 thereof in particular. Thus, while overcoming the deficiencies of simpler fishing reels, the Sutz reel does so by a highly complicated, and hence, relatively expensive reel which is accordingly susceptible to malfunction, parts breakage and costly repair.

Perhaps the reel most similar to the present invention is that disclosed in U.S. Pat. No. 3,006,574 in the name of Elbert C. Hardy which issued on Oct. 31, 1961. In this case line is wound about an annular member which rotates relative to an inner annular member, and the latter can be cradled between the thumb and fingers of a user. The braking action is created by an annular disc which is connected to the inner annular member, overrides the outer annular member, and can be actuated by thumb, fingers, or both, to control drag. However, even in its simplicity, the hand reel of the Hardy patent includes structural features which create problems, particularly in use. One such disadvantage is the braking system which, though admittedly simplistic, is also subject to misuse. The construction is such that if one can apply regular pressure upon the larger of two brake discs, a relatively efficient braking action should be effected, but due to the presence of two braking discs it is virtually impossible to actuate one by thumb without actuating the other by the fingers and vice versa. Hence, the tendency is to under brake or overbrake with the attendant disadvantages, losing a fish because of a loose line or simply losing the fish because of a broken line. Furthermore, as the braking disc or discs are depressed axially they necessarily result in an inherent shift of the outer annular member relative to the inner annular member, thus resulting in a cocking and attendant unreliable (sporadic) relative rotation between the two parts of the reel. This obviously can result in an abrupt braking between the opposing cylindrical rotational surfaces of the inner and outer members creating line breakage.

Other patents dealing with hand reels which have been noted by applicant/patentee include:

| Patent No. | Inventor(s) | Issued |
| --- | --- | --- |
| 3,289,968 | Henry A. Wilson | December 6, 1966 |
| 3,388,876 | Henry A. Wilson | June 18, 1968 |
| 2,753,131 | D. D. Erdman | July 3, 1956 |
| 2,692,093 | Tengesal | October 19, 1954 |
| 3,476,332 | Sutz | November 4, 1969 |
| 3,484,979 | Wonsch | December 23, 1969 |
| 4,293,104 | Guim | October 6, 1981 |
| 2,615,649 | Flewelling | October 28, 1952 |
| 4,195,794 | Ricci et al | April 1, 1980 |
| 3,687,393 | Wilson | August 29, 1972 |
| 3,557,483 | Wilson | January 26, 1971 |
| 2,483,696 | Giera | October 4, 1949 |
| 4,306,688 | Hechler, IV | December 22, 1981 |
| 4,215,828 | Rathbun et al | August 5, 1980 |
| 4,200,249 | Synstelien et al | April 29, 1980 |
| 4,057,220 | Kudlacek | November 8, 1977 |
| 3,952,965 | Falcon | April 27, 1976 |
| 3,823,502 | Countryman | July 16, 1974 |
| 4,229,900 | Collins | October 28, 1980 |

In accordance with the foregoing, a primary object of the present invention is to overcome the latter-noted and other disadvantages of such latter noted conventional hand reels, be they particularly designed for fishing or otherwise, by providing inner and outer relatively rotatable annular members preferably constructed from injected plastic material, the inner annular member having a slot for axially slidably receiving a braking mechanism, the outer annular member having an inner peripheral flange and an associated annular braking surface portion opposing the braking mechanism, and the braking mechanism having an inboard end portion engaging the annular braking surface portion to effectively create desired "drag" when the braking mechanism is manipulated by the fingers of a user.

Still another object of this invention is to provide a novel hand reel particularly adapted for fishing which further includes constructing the inner annular member from a pair of generally identical annular halves, providing the inner annular member halves with a plurality of notches, and securing the annular halves together with the notches aligned such that the latter define a plurality of guide slots for guiding the rotation of the outer annular member in its rotation relative to the inner annular member.

Yet another object of this invention is to provide a novel fishing hand reel as aforesaid wherein the outer annular member is also formed of two annular halves each having an inner peripheral edge portion, one of the inner peripheral edge portions having a plurality of openings, the other of the inner peripheral edge portions having a plurality of projections, the projections being received in the openings, and the projections and openings being disposed about an arc of the annular braking surface portion whereby as the braking mechanism inboard end portion moves across the projections and openings an audible sound is created which is indicative of rotation of the outer annular member relative to the inner annular member as occurs when a fish is being fought and line is being withdrawn against the "drag".

Another object of this invention is to provide a novel fishing line hand reel as aforesaid wherein the braking mechanism includes an outboard end portion manipulable by the fingers of a user when the hand reel is cradled in the user's palm, the outboard end portion including a pair of recesses, a compression spring in each recess, and a metallic ball associated with each compression spring defining the inboard end portion of the braking mechanism in bearing contact with the annular braking surface portion for creating the aforementioned desired "drag".

With the above and other objects in view that will hereinafter appear, the nature of the invention will be more clearly understood by reference to the following detailed description, the appended claims and the several views illustrated in the accompanying drawings.

IN THE DRAWINGS:

FIG. 1 is a perspective view of a fishing line hand reel constructed in accordance with this invention, and illustrates the manner in which the hand reel is held when an associated fishing line is being cast.

FIG. 2 is a perspective view of the hand reel, and illustrates the hand reel being grasped in a cradling fashion in the palm of the user with the user's finger's positioned adjacent a braking mechanism to selectively control the "drag" of the hand reel.

FIG. 3 is a fragmentary side elevational view of the hand reel, and illustrates inner and outer relatively rotatable annular members, a generally arcuate actuator of a braking mechanism carried by the inner annular member, and plurality of hooks engaging ledges along inboard peripheral edge portions of two annular halves of the outer annular member.

FIG. 8 is an enlarged sectional view taken generally along line 8—8 of FIG. 3, and illustrates the manner in which axially opposed notches of the inner annular member halves define a guide slot for the innermost peripheral edge portions of the outer annular member.

FIG. 9 is an enlarged fragmentary sectional view taken generally along line 9—9 of FIG. 3, and illustrates the plug of FIG. 5 and the brake mechanism of FIGS. 3 and 7, including a pair of springs each biasing a metallic ball against an annular braking surface portion along an inner peripheral edge portion of one of the outer annular member halves.

FIG. 10 is an enlarged cross sectional view taken generally along line 10—10 of FIG. 3, and illustrates the manner in which the balls, hooks and openings are positioned along an arc corresponding to the position of the annular braking surface portion such that an audible sound is created indicative of "drag" upon relative rotation between the inner and outer annular members.

FIG. 11 is a fragmentary sectional view taken generally along the line 11—11 of FIG. 3, and illustrates a friction pad carried in a recess of the annular braking mechanism.

FIG. 12 is an enlarged fragmentary cross sectional view taken generally along the line 12—12 of FIG. 10, and illustrates one of the projecting hooks engaging an associated ledge to maintain the inner and outer annular halves of the outer annular member in at least temporary assembled relationship.

Figure 4:
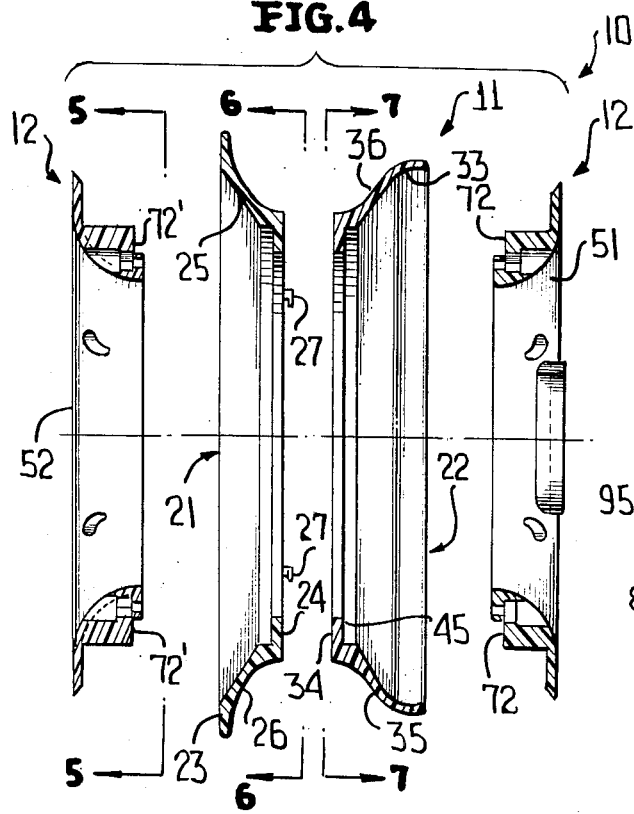
FIG. 4 is an exploded view, partially in side elevation and partially in axially cross section of the hand reel, and illustrates the two annular halves of each of the inner and outer annular members.

A novel hand reel particularly adapted for fishing is shown in two of its use positions in FIGS. 1 and 2 of the drawings and is generally designated by the reference numeral 10. The hand reel 10 is of a generally annular configuration and is illustrated in FIGS. 1 and 2 in generally cradled relationship within a palm P of a user's hand H. In this cradled relationship the user's fingers F and thumb T are at opposite axial sides of the hand reel 10 and are in generally opposed relationship to each other.

Fishing line L is wrapped in a coil C about the hand reel 10 and includes most typically one or more swivels S, a drop line or leader D, a hook K and a sinker or weight W. In FIG. 1 the hand reel 10 is illustrated in the casting position thereof in which the axis of the hand reel 10 is generally parallel to the direction of the cast. The user simply holds the hand reel 10 in his left hand H, for example, grasps the line L up-reel from the swivels S, twirls the free end of the line in bolo fashion, except in a generally vertical plane, and times the release such that the weight W uncoils the line L from an outer annular member 11 of the hand reel 10. The outer annular member 11 is mounted for rotation relative to an inner annular member 12 which also carries a braking mechanism 13 (FIGS. 2, 3, 9 and 10).

In order to wind the line L back upon the fishing reel 10 when, for example, fighting a hooked fish, the hand 10 is grasped as shown in FIG. 2 in the left hand H reel 10 and the user simply uses his right hand to manually rotate the outer annular member 11 in a counter-clockwise direction, as viewed in FIG. 2, relative to the inner annular member 12. FIG. 2 is also typical of the "fighting" position of the hand reel 10, particularly when a hooked fish "runs", which can be counteracted by the user's fingers F selectively manipulating the braking mechanism 13 to increase or decrease the "drag", as will be more apparent hereinafter.

The outer annular member 11 of the reel 10 is formed from two separate injection molded polymeric or copolymeric plastic material annular halves 21, 22, as are best illustrated in FIGS. 3, 4, 6 and 8–11 of the drawings.

The annular half 21 of the outer annular member 11 includes a generally radially outwardly directed circumferential flange 23, a generally radially inwardly directed circumferential flange 24 and a peripheral wall portion 25 therebetween. The flanges 23, 24 and the peripheral wall portion 25 collectively define an annular extending arcuate surface 26. Four equally circumferentially spaced axially projecting hooks or hook-like projections 27 (FIGS. 3, 4, 6 and 12) are carried by the flange 24. Each hook 27 includes an axially projecting neck 28 which is of a cordal axial cross sectional configuration (FIG. 12) terminating in a relatively short tangentially projecting lip 29 having a free terminal edge 30. A semicircular opening 39 is formed in the flange 24 adjacent each hook 27.

The other annular half 22 of the outer annular member 11 likewise includes a circumferential flange 33 which though radially outwardly directed is also curved axially, as is most apparent from FIGS. 8 and 10 of the drawings. The annular half 22 includes a radially inwardly directed circumferential flange 34 which merges with the flange 33 through a peripherally extending wall portion 35. The flanges 33, 34 and the wall portion 35 collectively define an annular extending arcuate surface or surface portion 36.

The flange 34 also includes four equally circumferentially spaced semicircular through openings 49 (FIGS. 9, 10 and 12) each defined by a semicircular edge 59 and a cordal edge 69. The cordal edge 69 is also an edge of a semi-circular recessed ledge 38. The annular halves 21, 22 of the outer annular member 11 are assembled by aligning the hooks 27 with the openings 49, projecting each hook 27 into an opening 49, and rotating the annular halves 21, 22 such as to position each projecting lip 29 in axially overlying relationship to an associated ledge 38, as shown in FIG. 9, to prevent axial disassembly of the annular halves 21, 22 incident to permanently securing the same to each other. Preferably, an appropriate adhesive is applied to the opposing surfaces (unnumbered) of the flanges 24, 34 before the hooks 27 are interconnected with the ledges 38, and once thus intimately bonded to each other, the surfaces 26, 36 define a generally radially outwardly opening annular U-shaped channel or surface 40 (FIGS. 8 and 10) upon which the coil C of fishing line L is confined. The flange 33 is, of course, the flange directed in the direction of cast (FIG. 1) and because of its axially directed terminal curvature the line L unwinds or peels thereof in a relatively smooth and continuous fashion to permit the user to effect long and/or accurate casts.

The flange 34 of the annular half 22 also includes an annular axially outwardly facing surface 45 which defines a braking surface or braking surface portion of the hand reel 10 which cooperates with the braking mechanism 13 in a manner to be described more fully hereinafter. The annular braking surface portion 45 lies along an arc which includes the projections or hooks 27, the ledges 38 and the openings 49 which also function in conjunction with the braking mechanism 13 to produce an "audible" "clicking" signal or sound upon relative rotation of the outer annular member 11 relative to the inner annular member 12, as will become more apparent hereinafter.

The inner annular member 12 of the fishing hand reel 10 includes two annular halves 51, 52 which are identical, and thus only the annular half 51 will be described but the description thereof is applicable to the annular half 52 whose like elements have been primed.

The annular half 51 of the inner annular member 12 includes a smooth annular convex axially outermost surface 53 and a similarly curved inner surface 54 (FIG. 10) which cooperatively define a radially outwardly directed flange 55 having a terminal circumferential edge 56 and an axially directed flange 57 having a terminal edge 58. Six equally circumferentially spaced annular axially directed walls 61 are positioned adjacent the edge 58 and each is reinforced by an axially extending reinforcing rib 62. Each annular wall 61 is defined by an inboard cylindrical surface 63 (FIG. 8) and a hexagonal surface 64 which blends with a cylindrical bore 65 through a radial end wall 66 forming the bottom of each annular wall 61. When the annular halves 51, 52 are placed in coaxial relationship to each other and to the outer annular member 11 (FIGS. 3, 8 and 10) the bores 65, 65' are aligned and a screw 70 is inserted through each of the bores 63' and threaded home in a nut 71 housed in the associated hexagonal recess 64 to hold the two annular halves 51, 52 in assembled relationship to each other in the manner best illustrated in FIG. 8. In this position a notch 72 formed in each axial outboard end portion of each annular wall 61 defines with the corresponding notch 72' of the annular half 52 a generally radially outwardly opening guide slot 75 (FIGS. 8 and 10) which guidingly accommodates the flanges 24, 34 (FIG. 8) of the outer annular member 11. Thus, six slots 75 accurately guide the outer annular member 11 for rotation relative to the inner annular member 12 of the reel 10.

Figure 7:
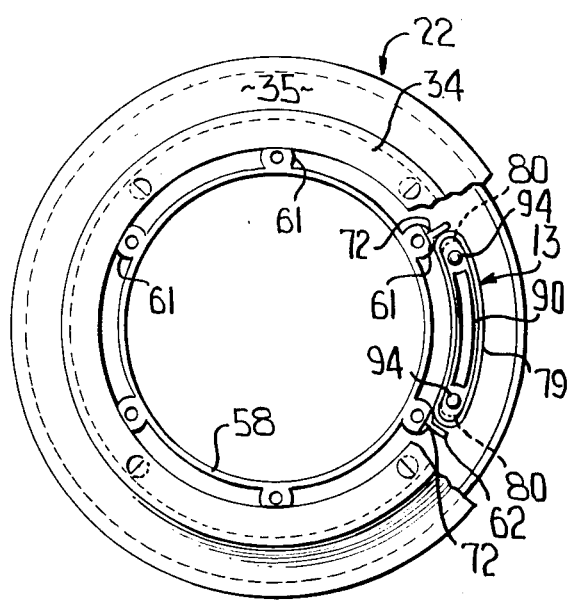
FIG. 7 is an axial end elevational view taken generally along line 7—7 of FIG. 4, and illustrates a braking mechanism carried by a slot of the other of the outer annular member halves and the manner in which the inner peripheral edge portion of the outer annular member half is received in and guided by the notches of the associated inner annular member half.

The braking mechanism 13 is housed within an arcuate slot 78 (FIGS. 9 and 10) whose axis of generation lies along the annular braking surface portion 45 of the flange 34 of the outer annular member 11 and specifically the annular half 22 thereof, as is most readily apparent in FIGS. 3, 7 and 10 of the drawings. The slot 78 is formed by an arcuate wall 79 whose circumferentially opposite ends are circumferentially recessed to define axially opening abutment shoulders or stops 80 (FIG. 9). A manually operable arcuate braking member 90 is reciprocally mounted in the slot 78 and includes at opposite arcuate ends thereof oppositely circumferentially projecting projections 91, 91 which are in axial alignment with the abutment shoulders 80, 80. Thus, while the breaking member 90 can be pushed by the fingers F of a user axially inwardly (upwardly as viewed in FIG. 9), axial outward movement (downwardly in FIG. 9) is limited by the contact of the projections 91 against the abutment shoulders 80.

The braking member 90 further includes two blind bores 92 each receiving a coil spring 93 bearing against a metal ball 94. The springs 93 normally bias the balls 94 against the annular braking surface portion 45 and additionally bias the projections 91 against the abutment shoulders 80 (FIG. 9). The former establishes a predetermined "drag" between the outer and inner annular members 11, 12, respectively, as relative rotation occurs therebetween, particularly when the line L (FIG. 2) is being drawn or pulled by a fish when being "played". The "drag" can be increased from a minimum (braking member 90 undepressed) to a maximum by the user's fingers F simply progressively pushing the braking member 90 in a direction toward the annular braking surface portion 45 of the flange 34 (upwardly in FIG. 9) which progressively increases the friction between the balls 94 and the braking surface portion 45 thus increasing "drag". This will effectively increase the force which must be exerted on the line L to rotate the outer annular member 11 relative to the inner annular member 12. Thus, by depressing and releasing the forces applied to the braking member 90, the user respectively increases and decreases the drag forces and thus can control the resistance on the fish through the line L.

The annular braking surface portion 45 also includes therealong the projections 27 and the openings 49, as was heretofore noted, particularly with respect to FIGS. 9 and 10. During rotation of the outer annular member 11 relative to the inner annular member 12 the balls 94 not only move along the annular braking surface portion 45, but also partially into and out of the openings 49 (see FIG. 10) and against the projections or hooks 27 which creates an audible "clicking" sound indicative of such relative rotation. The shorter the time span between these audible clicks or sounds, the faster the outer annular member 11 is rotating relative to the inner annular member 12 and vice versa. Thus, the speed of the repetition of the sounds is an indication of the speed of the fish moving against the drag which can be accordingly altered strictly in accordance with sound and in the absence of looking at the speed of rotation of the outer annular member 11. This is particularly advantageous for unsighted or partially sighted individuals who might not be able to accurately gauge the speed of rotation of the outer annular member 11 by visual inspection, yet can do so in a relatively accurate manner strictly through audible sounds. Furthermore, if the hand reel 10 is being used during trolling, it is not uncommon for the user to become inattentive during less continuous "action", and the "clicking" or audible sounds rapidly bring such user to attention by signifying that a fish has been hooked. Thus, as the metallic balls 94 move into and out of contact with the hooks and openings 27, 49, respectively, the sounds are indicative of both a first strike and the speed of rotation of the outer annular member 11 which is readily translated into the amount of drag applied to the line L.

Reference is made to FIGS. 9 and 11 of the drawing which illustrate an arcuate slot 100 in the braking member 90 of the braking mechanism 13. The arcuate slot 100 is approximately 2" long in a hand reel whose annular halves 51, 52 are approximately 7" OD, and generally spans the distance between the two bores 92, 92 of the braking member 90. An arcuate brake pad 101 of braking material having a relatively high coefficient of friction is housed within the slot 100 and has an exposed inboard end portion 102 which, upon axial inward movement of the braking member 90, will bear against the annular braking surface portion 45 of the flange 34. In this fashion the brake pad 101 and the balls 94 and springs 93 are collectively utilized for braking purposes.

Figure 5:
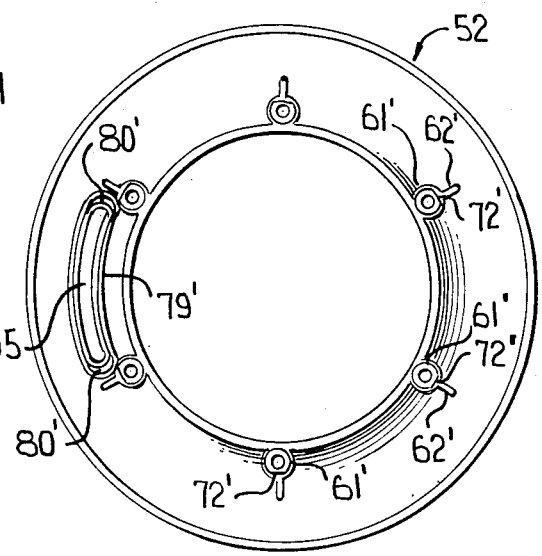
FIG. 5 is an axial end elevational view of one of the inner annular member halves taken along line 5—5 of FIG. 4, and illustrates an arcuate "plug" in an arcuate slot thereof along with a plurality of circumferentially spaced notches.
Figure 6:
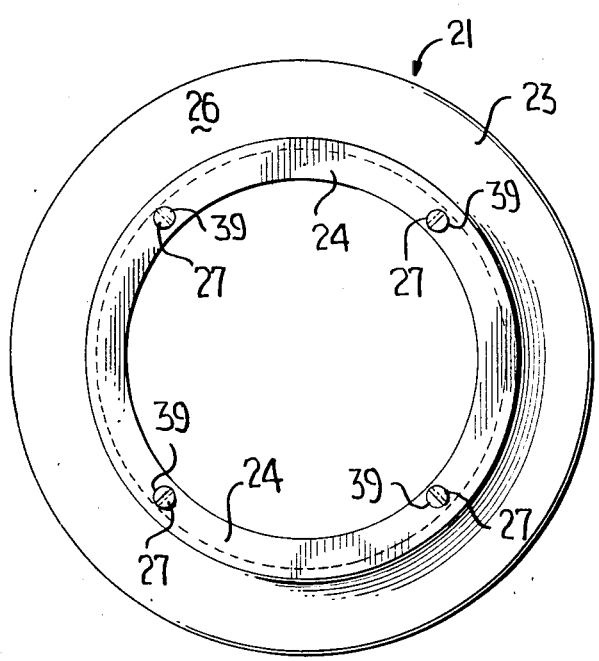
FIG. 6 is an axial end elevational view taken along the lines 6—6 of FIG. 4, and illustrates one of the outer annular member halves and a plurality of axially projecting hooks along an inner peripheral edge portion thereof.

Reference is made to FIGS. 5, 10 and 12 of the drawings in which the slot 78' is closed by an arcuate member or "plug" 95 which functions simply to close the slot 78'. The plug 95 is in tight friction fit in the slot 78' and therefore can be removed therefrom only intentionally. The plug 95 performs no other function than to close the slot 78' to preclude dirt, debris or other foreign substances from entering into the area between the annular members 11, 12 through the slot 78'. The reel 10 is, however, operative in the absence of the plug 95. Furthermore, the slot 78' could be totally eliminated, but this would require that the annular members 11, 12 be constructed each by a different mold.

In the present case a single mold is used to injection mold both inner annular member halves 51, 52 though only the inner annular member half 51 is provided with the braking mechanism 13 in the slot 78 thereof. Obviously, the provision of but a single mold allows the reel 10 to be manufactured at a lesser cost than if one mold were utilized to manufacture the inner annular half 51 with its slot 78 and the other inner annular half 52 without its slot 78'. Furthermore, the provision of the arcuate slot 78' allows the plug 95 to be removed or in lieu thereof another braking mechanism 13 can be substituted therefor in opposition to the braking mechanism 13 of the annular half 51. In this case when the hand reel 10 is held in the cradle position shown in FIG. 2 the "pad" of the thumb T would be positioned against the braking member (not shown) of the slot 78' while the fingers F would be positioned as heretofore described against the braking member 90 of the braking mechanism 13. Thus when the fingers F are manipulated to push the braking member 90 inwardly, the thumb pad would likewise create an oppositely directed force against the unillustrated braking member in the slot 78' and the metallic balls (not shown) thereof would likewise engage against the annular surface of the flange 24. Essentially, there would be two pair of balls bearing against opposite annular surfaces of the flanges 24, 34, as is most readily apparent from FIG. 9, to thus increase the overall braking forces which can be brought to bear against the rotation of the outer annular member 11. This structure permits ready modification of the hand reel 10 for light to moderate braking action on the one hand (only the braking mechanism 13 being employed) and relatively high braking action on the other hand (two opposing braking mechanisms being utilized).

Although in a preferred embodiment of the invention as has been specifically illustrated and described herein, it is to be understood that minor variations may be made in the apparatus without departing from the spirit and scope of the invention, as defined in the appended claims.

We claim:

1. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, means for biasingly urging said braking mechanism inboard end portion into contact with said annular braking surface portion, and said biasing means being disposed generally between said braking mechanism inboard and outboard end portions.

2. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, said inner annular member being formed of two generally identical annular halves, said slot being in a first of said annular halves, another identical slot in a second of said annular halves, and a plug filling and closing said another slot.

3. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, said inner annular member being formed of two annular halves, said annular halves each having a plurality of circumferentially spaced radially and axially outwardly opening notches, said notches of said two annular halves being positioned in axially aligned pairs to thereby each define a guide slot, and said outer annular member being guided rotationally by said guide slots.

4. The hand reel as defined in claim 3 wherein said outer annular member is formed of two generally annular halves, each outer annular member half includes an inboard peripheral edge portion, at least one adjacent opening and ledge formed by a first of said inboard peripheral edge portions, a hook formed by a second of said inboard peripheral edge portions, and said hook being received through said opening in axially overlapping locking engagement with said ledge.

5. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, said outer annular member is formed of two generally annular halves, each outer annular member half includes an inboard peripheral edge portion, at least one adjacent opening and ledge formed by a first of said inboard peripheral edge portions, a hook formed by a second of said inboard peripheral edge portions, and said hook being received through said opening in axially overlapping locking engagement with said ledge.

6. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, said annular braking surface portion being of an irregular surface configuration which creates an audible sound as said braking mechanism inboard end portion moves therealong upon relative rotation of said inner and outer annular members, means for biasingly urging said braking mechanism inboard end portion into contact with said annular braking surface portion, and said biasing means is disposed generally between said braking mechanism inboard and outboard end portions.

7. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, said annular braking surface portion being of an irregular surface configuration which creates an audible sound as said braking mechanism inboard end portion moves therealong upon relative rotation of said inner and outer annular members, said inner annular member is formed of two annular halves, said annular halves each having a plurality of circumferentially spaced radially and axially outwardly opening notches, said notches of said two annular havles being positioned in axially aligned pairs to thereby each define a guide slot, and said outer annular member being guided rotationally by said guide slots.

8. A hand reel for fishing line comprising an outer annular member having an outer peripheral surface upon which fishing line is adapted to be wound and unwound, said outer peripheral surface being of a generally U-shaped radially outwardly opening configuration as viewed in radial cross-section, said outer annular member being in external surrounding relative rotational relationship to an inner annular member adapted to be held in generally cradled relationship by the fingers of a user, said outer annular member including a generally annular braking surface portion, a braking mechanism, a slot in said inner annular member positioned in axially opposed relationship to said annular braking surface portion, said braking mechanism being housed at least in part in said slot in reciprocal sliding relationship thereto, said braking mechanism includes an axially inboard end portion in contact with said annular braking surface portion, said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish, said annular braking surface portion being of an irregular surface configuration which creates an audible sound as said braking mechanism inboard end portion moves therealong upon relative rotation of said inner and outer annular members, said outer annular member being formed of two generally annular halves, each outer annular member half including an inboard peripheral edge portion, at least one adjacent opening and ledge formed by a first of said inboard peripheral edge portions, a hook formed by a second of said inboard peripheral edge portions, and said hook being received through said opening in axially overlapping locking engagement with said ledge.

9. A hand reel for fishing line comprising an outer annular member having an outer peripheral surface upon which fishing line is adapted to be wound and unwound, said outer peripheral surface being of a generally U-shaped radially outwardly opening configuration as viewed in radial cross section, said outer annular member being in external surrounding relative rotational relationship to an inner annular member adapted to be held in generally cradled relationship by the fingers of a user, said inner annular member being formed of two annular halves, said annular halves each having a plurality of circumferentially spaced radially and axially outwardly opening notches, said notches of said two annular halves being positioned in axially aligned pairs to thereby each define a guide slot, and said outer annular member being guided rotationally by said guide slots.

10. The hand reel as defined in claim 9 wherein said outer annular member includes an inner peripheral edge portion, and said inner peripheral edge portion is guidingly received in said guide slots.

11. The hand reel as defined in claim 10 wherein said inner peripheral edge portion includes a generally annular braking surface portion, a braking mechanism carried by said inner annular member, said braking mechanism having an inboard end portion engageable against said annular braking surface portion through manual manipulation by the fingers of a user, and said annular braking surface portion is of an irregular surface configuration which creates an audible sound as said braking mechanism inboard end portion moves therealong upon relative rotation of said inner and outer annular members.

12. The hand reel as defined in claim 11 wherein said inner peripheral edge portion is formed as two halves, at least one adjacent opening and ledge formed by a first of said inner peripheral edge portion halven, a hook formed by a second of said inner peripheral edge portion halves, said hook being received through said opening in axially overlapping locking engagement with said ledge, and said opening, hook and ledge establish said irregular surface configuration.

13. A hand reel for fishing line comprising an outer annular member having an outer peripheral surface upon which fishing line is adapted to be wound and unwound, said outer peripheral surface being of a generally U-shaped radially outwardly opening configuration as viewed in radial cross section, said outer annular member being in external surrounding relative rotational relationship to an inner annular member adapted to be held in generally cradled relationship by the fingers of a user, said outer annular member being formed of two generally annular halves, each outer annular member half includes an inboard peripheral edge portion, at least one opening formed in a first of said inboard peripheral edge portions, a projection formed by a second of said inboard peripheral edge portions, said projection being received in said opening, one of said outer annular member halves having an annular braking surface portion defined in part by said opening and projection, a braking mechanism carried by said inner annular member, said braking mechanism having an axially inboard end portion in contact with said annular braking surface portion whereby an audible sound is emitted each time said axially inboard end portion strikes one of said projection and opening upon relative rotation between said annular members, and said braking mechanism further includes an axially outboard end portion manually manipulatable by the finger tips of a user's hand to selectively regulate the braking force between said braking mechanism inboard end portion and said annular braking surface portion to effectively create desired drag particularly when utilizing the hand reel to fight a fish.

14. The hand reel as defined in claim 13 wherein said inner member is formed of two annular halves, said annular halves each having a plurality of circumferentially spaced radially and axially outwardly opening notches, said notches of said two annular halves being positioned in axially aligned pairs to thereby each define a guide slot, and said outer annular member being guided rotationally by said guide slots.

* * * * *